US012806821B2

(12) United States Patent
Ben-Zur et al.

(10) Patent No.: US 12,806,821 B2
(45) Date of Patent: Nov. 24, 2026

(54) HARDENING METHOD AND APPARATUS, PARTICULARLY APPLICABLE TO METAL AND/OR CERAMICS

(71) Applicant: Tritone Technologies Ltd., Rosh HaAyin (IL)

(72) Inventors: Ofer Ben-Zur, Hod-HaSharon (IL); Hagai Peled, Tel-Aviv (IL)

(73) Assignee: Tritone Technologies Ltd., Rosh HaAyin (IL)

( * ) Notice: Subject to any disclaimer, the term of this patent is extended or adjusted under 35 U.S.C. 154(b) by 0 days.

(21) Appl. No.: 17/272,316

(22) PCT Filed: Aug. 27, 2019

(86) PCT No.: PCT/IL2019/050957
§ 371 (c)(1),
(2) Date: Feb. 28, 2021

(87) PCT Pub. No.: WO2020/044336
PCT Pub. Date: Mar. 5, 2020

(65) Prior Publication Data

US 2021/0178484 A1 Jun. 17, 2021

Related U.S. Application Data

(60) Provisional application No. 62/724,120, filed on Aug. 29, 2018.

(51) Int. Cl.
*B33Y 10/00* (2015.01)
*B22F 10/50* (2021.01)
(Continued)

(52) U.S. Cl.
CPC .............. *B28B 7/342* (2013.01); *B22F 10/50* (2021.01); *B22F 12/67* (2021.01); *B28B 1/001* (2013.01);
(Continued)

(58) Field of Classification Search
CPC ......... B33Y 10/00; B33Y 30/00; B33Y 80/00; B28B 1/001; B28B 7/346; F26B 1/00;
(Continued)

(56) References Cited

U.S. PATENT DOCUMENTS 5,737,683 A 4/1998 Sterzel
5,824,250 A 10/1998 Whalen et al.
(Continued)

FOREIGN PATENT DOCUMENTS

CN 101449295 6/2009
CN 101306950 1/2011
(Continued)

OTHER PUBLICATIONS

International Search Report and the Written Opinion Dated Apr. 3, 2022 From the International Searching Authority Re. Application No. PCT/IL2021/051349. (16 Pages).
(Continued)

*Primary Examiner* — Tabassom Tadayyon Eslami

(57) ABSTRACT

Apparatus and method for hardening a paste within walls of a mold, comprises a sealing hood that opens to a first position allowing paste to be applied within the mold and then closes to provide an airtight seal around the mold and the paste applied within the mold. Then a vacuum source evacuates air from the sealing hood in its closed position to apply a vacuum to the paste. The vacuum causes liquids to evaporate from the paste, and thus hardens the paste.

10 Claims, 10 Drawing Sheets

SECTION A-A

(51) Int. Cl.

| | |
|---|---|
| ***B22F 12/67*** | (2021.01) |
| ***B28B 1/00*** | (2006.01) |
| ***B28B 7/34*** | (2006.01) |
| ***B33Y 30/00*** | (2015.01) |
| *B22F 10/18* | (2021.01) |
| *B22F 10/368* | (2021.01) |
| *B22F 10/40* | (2021.01) |
| *B22F 10/62* | (2021.01) |
| *B22F 10/64* | (2021.01) |

(52) U.S. Cl.
CPC .............. *B33Y 10/00* (2014.12); *B33Y 30/00* (2014.12); *B22F 10/18* (2021.01); *B22F 10/368* (2021.01); *B22F 10/40* (2021.01); *B22F 10/62* (2021.01); *B22F 10/64* (2021.01); *B22F 2201/20* (2013.01)

(58) Field of Classification Search
CPC ... F26B 3/30; F26B 5/00; B29C 64/00; B29C 64/40; B29C 64/10; B22F 10/00; B22F 12/00; B41J 3/4073
USPC ........................................................... 118/50
See application file for complete search history.

(56) References Cited

U.S. PATENT DOCUMENTS

| | | | | |
|---|---|---|---|---|
| 6,375,880 | B1 | 4/2002 | Cooper et al. | |
| 6,596,224 | B1 | 7/2003 | Sachs et al. | |
| 8,313,598 | B2 | 11/2012 | Butler | |
| 9,156,194 | B2 | 10/2015 | Ng et al. | |
| 9,981,426 | B2 | 5/2018 | Guenther et al. | |
| 10,137,642 | B1 * | 11/2018 | Gifford | B22F 10/20 |
| 2002/0033565 | A1 | 3/2002 | Hayashi | |
| 2003/0044301 | A1 | 3/2003 | Lefebvre et al. | |
| 2003/0054668 | A1 * | 3/2003 | Kitano | H01L 21/67034 438/782 |
| 2005/0015171 | A1 | 1/2005 | Cruz-Uribe et al. | |
| 2005/0206034 | A1 * | 9/2005 | Yokoyama | B29C 33/3842 264/219 |
| 2006/0156978 | A1 * | 7/2006 | Lipson | A61L 27/54 438/3 |
| 2007/0126331 | A1 | 6/2007 | Kim et al. | |
| 2008/0075619 | A1 | 3/2008 | Hosamani et al. | |
| 2010/0021638 | A1 | 1/2010 | Varanka et al. | |
| 2013/0220570 | A1 | 8/2013 | Sears et al. | |
| 2014/0272121 | A1 | 9/2014 | Ng et al. | |
| 2014/0277664 | A1 | 9/2014 | Stump | |
| 2014/0339745 | A1 | 11/2014 | Uram | |
| 2015/0014885 | A1 | 1/2015 | Hofmann et al. | |
| 2015/0096467 | A1 | 4/2015 | Trivedi et al. | |
| 2015/0303366 | A1 | 10/2015 | Yoshimi et al. | |
| 2015/0352783 | A1 | 12/2015 | Snyder et al. | |
| 2016/0052212 | A1 | 2/2016 | Schmidt | |
| 2016/0229128 | A1 * | 8/2016 | Dayagi | B22F 10/14 |
| 2016/0303654 | A1 | 10/2016 | Derguti et al. | |
| 2016/0311167 | A1 * | 10/2016 | Günther | B33Y 10/00 |
| 2016/0354981 | A1 | 12/2016 | Bredemeyer et al. | |
| 2017/0106444 | A1 | 4/2017 | Ishida et al. | |
| 2018/0022032 | A1 | 1/2018 | Mark et al. | |
| 2018/0036417 | A1 | 2/2018 | Lam et al. | |
| 2018/0071819 | A1 | 3/2018 | Connor et al. | |
| 2018/0093326 | A1 * | 4/2018 | Ishida | B22F 1/10 |
| 2018/0193915 | A1 | 7/2018 | Fribourg et al. | |
| 2018/0250877 | A1 | 9/2018 | Okamoto et al. | |
| 2018/0304365 | A1 | 10/2018 | Brzezinski et al. | |
| 2019/0375006 | A1 | 12/2019 | Barua et al. | |
| 2020/0171568 | A1 | 6/2020 | Giller et al. | |
| 2020/0269320 | A1 | 8/2020 | Ben-Zur et al. | |
| 2020/0338818 | A1 | 10/2020 | Teng | |
| 2021/0009476 | A1 | 1/2021 | Kawai | |
| 2021/0031404 | A1 | 2/2021 | Yang et al. | |
| 2021/0197268 | A1 | 7/2021 | Nauka et al. | |
| 2022/0072613 | A1 | 3/2022 | Ben-Zur et al. | |
| 2022/0235194 | A1 | 7/2022 | Peled | |

FOREIGN PATENT DOCUMENTS

| | | |
|---|---|---|
| CN | 103612315 | 3/2014 |
| CN | 204136193 | 2/2015 |
| CN | 104798216 | 7/2015 |
| CN | 204451221 | 7/2015 |
| CN | 105834422 | 8/2016 |
| CN | 106270512 | 1/2017 |
| CN | 107864639 | 3/2018 |
| CN | 107877854 | 4/2018 |
| CN | 108083812 | 5/2018 |
| CN | 110228996 | 9/2019 |
| CN | 110831711 | 2/2020 |
| DE | 102004035386 | 9/2005 |
| EP | 0688746 | 1/2000 |
| EP | 2714354 | 4/2014 |
| EP | 3302941 | 4/2018 |
| EP | 3600724 | 2/2020 |
| FR | 2944721 | 10/2010 |
| JP | H06-179243 | 6/1994 |
| JP | 10-273703 | 10/1998 |
| JP | 2004-296177 | 10/2004 |
| JP | 2008-263179 | 10/2008 |
| JP | 2015-168135 | 9/2015 |
| JP | 2016-518267 | 6/2016 |
| JP | 2016-132102 | 7/2016 |
| JP | 2016-221894 | 12/2016 |
| JP | 2017-087244 | 5/2017 |
| JP | 2018-059131 | 4/2018 |
| JP | 2018-080359 | 5/2018 |
| JP | 2018-141225 | 9/2018 |
| WO | WO 2007/016469 | 2/2007 |
| WO | WO 2012/164078 | 12/2012 |
| WO | WO 2014/080332 | 5/2014 |
| WO | WO 2014/153535 A2 | 9/2014 |
| WO | WO 2016/124432 | 8/2016 |
| WO | WO 2016/199131 | 12/2016 |
| WO | WO 2017/180314 | 10/2017 |
| WO | WO 2018/102731 | 6/2018 |
| WO | WO 2018/149748 | 8/2018 |
| WO | WO 2018/156933 | 8/2018 |
| WO | 2018/203331 * | 11/2018 |
| WO | WO 2019/213596 | 11/2019 |
| WO | WO 2020/044336 | 3/2020 |
| WO | WO 2020/129049 | 6/2020 |
| WO | WO 2020/225591 | 11/2020 |
| WO | WO 2021/009748 | 1/2021 |
| WO | WO 2022/101915 | 5/2022 |

OTHER PUBLICATIONS

Examination Report Under Sections 12 & 13 of the Patents Act, 1970 and the Patents Rules, 2003 Dated Jan. 27, 2022 From the Government of India, Intellectual Property India, Patents, Designs, Trade Marks, Geographical Indications, the Patent Office Re. Application No. 201927048618. (7 Pages).

International Search Report and the Written Opinion Dated Aug. 12, 2018 From the International Preliminary Examining Authority Re. Application No. PCT/IL2018/050475. (14 Pages).

Notification of Office Action Dated Jun. 2, 2021 From the China National Intellectual Property Administration Re. Application No. 201880043485.9. (7 Pages).

Translation Dated Jun. 22, 2021 of Notification of Office Action Dated Jun. 2, 2021 From the China National Intellectual Property Administration Re. Application No. 201880043485.9. (6 Pages).

Notification of Office Action and Search Report Dated Oct. 19, 2021 From the State Intellectual Property Office of the People's Republic of China Re. Application No. 201880043485.9. (7 Pages).

Shiyong "Chinese Document. 3D Dayin Shiyong Jiaocheng", 4.P., Aug. 31, 2018.

Official Action Dated Apr. 27, 2022 from US Patent and Trademark Office Re. U.S. Appl. No. 16/605,241. (66 pages).

Shen et al.

Notice of Reason(s) for Rejection Dated Feb. 8, 2022 From the Japan Patent Office Re. Application No. 2019-559325. and Its Translation Into English. (9 Pages).

(56) References Cited

OTHER PUBLICATIONS

International Preliminary Report on Patentability Dated Jan. 11, 2021 From the International Preliminary Examining Authority Re. Application No. PCT/IL2019/050957. (15 Pages).
International Preliminary Report on Patentability Dated Aug. 27, 2019 From the International Preliminary Examining Authority Re. Application No. PCT/IL2018/050475. (11 Pages).
International Search Report and the Written Opinion Dated Dec. 2, 2019 From the International Searching Authority Re. Application No. PCT/IL2019/050957. (24 Pages).
International Search Report and the Written Opinion Dated Sep. 11, 2019 From the International Searching Authority Re. Application No. PCT/IL2019/053749. (15 Pages).
International Search Report and the Written Opinion Dated Aug. 12, 2018 From the International Searching Authority Re. Application No. PCT/IL2018/050475. (14 Pages).
International Search Report and the Written Opinion Dated Mar. 17, 2020 From the International Searching Authority Re. Application No. PCT/IL2019/051362. (13 Pages).
Notification of Office Action and Search Report Dated Sep. 30, 2020 From the State Intellectual Property Office of the People's Republic of China Re. Application No. 201880043485.9 and Its Translation of Office Action Into English. (14 Pages).
Fraunhofer IFAM "Welcome to Fraunhofer IFAM Dresden", Fraunhofer Institute for Manufacturing Technology and Advanced Materials IFAM, Homepage: Profile, 5 P., 2019.
Rapidia Tech "The Fastest and Simplest Way to 3D Print Metal", Rapidia Tech, Website, 6 P., 2019.
Restriction Official Action Dated Jan. 19, 2022 from US Patent and Trademark Office Re. U.S. Appl. No. 16/605,241. (8 pages).
International Preliminary Report on Patentability Dated Apr. 13, 2021 From the International Preliminary Examining Authority Re. Application No. PCT/IL2019/051362. (11 Pages).
International Preliminary Report on Patentability Dated Nov. 18, 2021 From the International Bureau of WIPO Re. Application No. PCT/IB2019/053749. (8 Pages).
Translation dated Nov. 8, 2021 of Notification of Office Action and Search Report Dated Oct. 19, 2021 From the State Intellectual Property Office of the People's Republic of China Re. Application No. 201880043485.9. (6 Pages).
Examination Report Under Sections 12 & 13 of the Patents Act, 1970 and the Patents Rules, 2003 Dated Aug. 16, 2022 From the Government of India, Intellectual Property India, Patents, Designs, Trade Marks, Geographical Indications, the Patent Office Re. Application No. 2002127010112. (6 Pages).
Notification of Office Action and Search Report Dated Jul. 4, 2022 From the State Intellectual Property Office of the People's Republic of China Re. Application No. 201980069122.7. (7 Pages).
Supplementary European Search Report and the European Search Opinion Dated May 24, 2022 From the European Patent Office Re. Application No. 18794491.3. (10 Pages).
Translation Dated Jul. 25, 2022 of Notification of Office Action Dated Jul. 4, 2022 From the State Intellectual Property Office of the People's Republic of China Re. Application No. 201980069122.7. (3 Pages).
International Preliminary Report on Patentability May 25, 2023 From the International Bureau of WIPO Re. Application No. PCT IL2021/051349. (9 Pages).
Notification of Office Action Dated Sep. 14, 2023 From the State Intellectual Property Office of the People's Republic of China Re. Application No. 201980097281.8. (3 Pages).
English Summary Dated Aug. 30, 2023 of Decision on Rejection Dated Aug. 16, 2023 From the State Intellectual Property Office of the People's Republic of China Re. Application No. 201980069122. 7. (2 pages).
Notice of Reason(s) for Rejection Dated Aug. 22, 2023 From the Japan Patent Office Re. Application No. 2021-510407 and Its Translation Into English. (7 Pages).
Notice of Reason(s) for Rejection Dated Apr. 25, 2023 From the Japan Patent Office Re. Application No. 2021-510407 and Its Translation Into English. (18 Pages).
Notice of Reason(s) for Rejection Dated Apr. 4, 2023 From the Japan Patent Office Re. Application No. 2021-566051. and Its Translation Into English. (7 pages).
Pre Appeal Examination Dated Mar. 23, 2023 From the Japan Patent Office Re. Application No. 2019-559325 and Its Translation Into English. (9 Pages).
Supplementary European Search Report and the European Search Opinion Dated Mar. 31, 2023 From the European Patent Office Re. Application No. 19927676.7. (9 Pages).
Decision on Rejection Dated Aug. 16, 2023 From the State Intellectual Property Office of the People's Republic of China Re. Application No. 201980069122.7 and Its Machine Translation Into English. (12 Pages).
Notice of Reason(s) for Rejection Dated Aug. 15, 2023 From the Japan Patent Office Re. Application No. 2021-566051. and Its Translation Into English. (6 pages).
Summary Dated Dec. 1, 2022 of Notification of Office Action Dated Nov. 11, 2022 From the State Intellectual Property Office of the People's Republic of China Re. Application No. 201980097281.8. (2 Pages).
Examination Report Under Sections 12 & 13 of the Patents Act, 1970 and the Patents Rules, 2003 Dated May 26, 2023 From the Government of India, Intellectual Property India, Patents, Designs, Trade Marks, Geographical Indications, The Patent Office Re. Application No. 202127053942. (6 pages).
English Summary and Translation Dated Sep. 28, 2023 of Notification of Office Action Dated Sep. 14, 2023 From the State Intellectual Property Office of the People's Republic of China Re. Application No. 201980097281.8. (2 pages).
Notice of Reason(s) for Rejection Dated Sep. 27, 2022 From the Japan Patent Office Re. Application No. 2019-559325 and Its Translation Into English. (9 Pages).
Notification of Office Action and Search Report Dated Nov. 11, 2022 From the State Intellectual Property Office of the People's Republic of China Re. Application No. 201980097281.8. (8 Pages).
Supplementary European Search Report and the European Search Opinion Dated Sep. 13, 2022 From the European Patent Office Re. Application No. 19898883.4. (10 pages).
Final Official Action Dated Mar. 10, 2023 from the US Patent and Trademark Office Re. U.S. Appl. No. 16/605,241. (48 pages).
Notification of Office Action Dated Feb. 25, 2023 From the State Intellectual Property Office of the People's Republic of China Re. Application No. 201980069122.7. (6 Pages).
Office Action Dated Mar. 5, 2023 From the Israel Patent Office Re. Application No. 270345. (7 Pages).
Summary Dated Mar. 14, 2023 of Notification of Office Action Dated Feb. 25, 2023 From the State Intellectual Property Office of the People's Republic of China Re. Application No. 201980069122. 7. (6 Pages).
Notice of Reason(s) for Rejection Dated Dec. 12, 2023 From the Japan Patent Office Re. Application No. 2019-559325 and Its Translation Into English. (16 Pages).
Office Action Dated Feb. 20, 2024 From the Israel Patent Office Re. Application No. 281151. (6 Pages).
Communication Pursuant to Article 94(3) EPC Dated Oct. 13, 2023 From the European Patent Office Re. Application No. 19856125.0 (5 Pages).
Restriction Official Action Dated Mar. 6, 2024 from the US Patent and Trademark Office Re. U.S. Appl. No. 17/414,496. (9 pages).
Hearing Notice Dated Oct. 30, 2023 From the Government of India, Intellectual Property India, the Patent Office Re. Application No. 201927048618. (3 Pages).
Hearing Notice Dated Feb. 3, 2024 From the Government of India, Intellectual Property India, the Patent Office Re. Application No. 202127010112. (3 Pages).
Official Action Dated Feb. 9, 2024 from the US Patent and Trademark Office Re. U.S. Appl. No. 16/605,241. (41 pages).
Pollinger "Gel Casting", Encyclopedia of Materials: Science and Technology, 4: 3486-3492, 2001.

(56) References Cited

OTHER PUBLICATIONS

Translation Dated Jan. 23, 2024 of Notice of Reason(s) for Rejection Dated Dec. 12, 2023 From the Japan Patent Office Re. Application No. 2021-531292. (4 pages).
English Summary and Translation Dated Dec. 27, 2023 of Notification of Office Action Dated Dec. 14, 2023 From the State Intellectual Property Office of the People's Republic of China Re. Application No. 201980097281.8. (2 Pages).
Notice of Reason(s) for Rejection Dated Dec. 12, 2023 From the Japan Patent Office Re. Application No. 2021-531292. (3 pages).
Notification of Office Action Dated Dec. 14, 2023 From the State Intellectual Property Office of the People's Republic of China Re. Application No. 201980097281.8. (3 Pages).
English Summary of Notice of Re-examination Dated Jun. 22, 2024 From the State Intellectual Property Office of the People's Republic of China Re. Application No. 201880043485.9. (3 Pages).
Notice of Re-examination Dated Jun. 22, 2024 From the State Intellectual Property Office of the People's Republic of China Re. Application No. 201880043485.9 and Its Machine Translation. (31 Pages).
Office Action Dated Jul. 11, 2024 From the Israel Patent Office Re. Application No. 287869. (4 Pages).
Official Action Dated Jun. 25, 2024 from the US Patent and Trademark Office Re. U.S. Appl. No. 16/605,241. (32 pages).
Restriction Official Action Dated May 13, 2024 from the US Patent and Trademark Office Re. U.S. Appl. No. 17/609,391. (16 pages).
Li "Introduction to 3D Printing Technology," edited by Shi Yusheng, pp. 1-4, Hubei Science and Technology Press, publication date: Feb. 2016.
Communication Pursuant to Article 94(3) EPC Dated Aug. 27, 2024 From the European Patent Office Re. Application No. 18794491.3. (11 Pages).
Examination Report Dated Sep. 27, 2024 From the Australian Government, IP Australia Re. Application No. 2019330385. (3 Pages).
Official Action Dated Aug. 23, 2024 From the US Patent and Trademark Office Re. U.S. Appl. No. 17/414,496. (116 Pages).
Advisory Action Dated Oct. 4, 2024 from the US Patent and Trademark Office Re. U.S. Appl. No. 16/605,241. (5 pages).
Office Action Dated Feb. 13, 2025 From the Israel Patent Office Re. Application No. 281151. (3 Pages).
Advisory Action Dated Dec. 6, 2024 from the US Patent and Trademark Office Re. U.S. Appl. No. 16/605,241. (5 pages).
Decision of Reexamination Dated Dec. 10, 2024 From the State Intellectual Property Office of the People's Republic of China Re. Application No. 201880043485.9 with its Machine Translation into English. (51 Pages).
Official Action Dated Nov. 29, 2024 from the US Patent and Trademark Office Re. U.S. Appl. No. 17/609,391. (106 pages).
Hearing Notice Dated Apr. 3, 2024 From the Government of India, Intellectual Property India, the Patent Office Re. Application No. 202127053942. (2 Pages).
Supplementary European Search Report and the European Search Opinion Dated Apr. 20, 2022 From the European Patent Office Re. Application No. 19856125.0. (11 Pages).

* cited by examiner

HARDENING METHOD AND APPARATUS, PARTICULARLY APPLICABLE TO METAL AND/OR CERAMICS

RELATED APPLICATIONS

This application is a National Phase of PCT Patent Application No. PCT/IL2019/050957 having International filing date of Aug. 27, 2019, which claims the benefit of priority under 35 USC § 119(e) of U.S. Provisional Patent Application No. 62/724,120 filed on Aug. 29, 2018. The contents of the above applications are all incorporated by reference as if fully set forth herein in their entirety.

FIELD AND BACKGROUND OF THE INVENTION

The present invention, in some embodiments thereof, relates to a process and an apparatus for additive manufacturing of metal and ceramic parts.

Additive Manufacturing, or 3D printing, is widely used today to make prototype parts and for small-scale manufacturing. A widely used technique is fused deposition modeling (FDM) in which a plastic filament is unwound from a coil, fused and passed through a nozzle to be laid down as flattened strings to form layers from which a 3D object eventually emerges.

Another technique that is used is stereolithography. Stereolithography is an additive manufacturing process that works by focusing an ultraviolet (UV) laser on to a vat of photopolymer resin. With the help of computer aided manufacturing or computer aided design software (CAM/CAD), the UV laser is used to draw a pre-programmed design or shape on to the surface of the photopolymer vat. Because photopolymers are photosensitive under ultraviolet light, the resin is solidified and forms a single layer of the desired 3D object. The process is repeated for each layer of the design until the 3D object is complete.

Selective Laser Sintering SLS is another additive manufacturing layer technology, and involves the use of a high power laser, for example, a carbon dioxide laser, to fuse small particles of plastic into a mass that has a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by one layer thickness, a new layer of material is applied on top, and the process is repeated until the part is completed.

Due to their relatively high melting temperatures, metal and ceramic materials are more difficult to use in additive manufacturing procedures.

Additive Manufacturing technologies are in general slow compared to conventional production processes such as machining etc. due to the building process of forming the part layer by layer.

Furthermore, there are certain shapes that cannot be achieved by straightforward Additive Manufacturing. Some of these shapes can be achieved by printing out support areas that are later removed, A metal printing technique which is widely used is the DMLS—Direct Metal Sintering Laser. A very thin layer of metal powder is spread across the surface that is to be printed. A laser is slowly and steadily moved across the surface to sinter the powder, Additional layers of powder are then applied and sintered, thus "printing" the object one cross-section at a time. In this way, DMLS gradually builds up a 3D object through a series of very thin layers.

Another method of 3D metal printing is selective laser melting (SLM), in which a high-powered laser fully melts each layer of metal powder rather than just sintering it. Selective laser melting produces printed objects that are extremely dense and strong. Selective laser melting can only be used with certain metals. The technique can be used for the additive manufacturing of stainless steel, tool steel, titanium, cobalt chrome and aluminum parts. Selective laser melting is a very high-energy process, as each layer of metal powder must be heated above the melting point of the metal. The high temperature gradients that occur during SLM manufacturing can also lead to stresses and dislocations inside the final product, which can compromise its physical properties.

Electron beam melting (EBM) is an additive manufacturing process that is very similar to selective laser melting. Like SLM, it produces models that are very dense. The difference between the two techniques is that EBM uses an electron beam rather than a laser to melt the metal powder. Currently, electron beam melting can only be used with a limited number of metals. Titanium alloys are the main starting material for this process, although cobalt chrome can also be used.

The above-described metal printing technologies are expensive, very slow, and limited by build size and materials that can be used.

Binder Jet 3D-Printing is widely used to print sand molds for castings or to generate complex ceramic parts. It is also known as a Metal Additive Manufacturing technology. Instead of melting the material, as is done in Selective Laser Melting (SLM) or Electron Beam Melting (EBM), the metal powders are selectively joined by an adhesive ink. The "green" part is afterwards going through thermal process processes—de binding and sintering and in some cases also infiltration of additional materials.

A technique for printing of ceramics is disclosed in Ceramics 3D Printing by Selective Inhibition Sintering—Khoshnevis et al., in which, as with metal, an inhibition material forms a boundary defining edges around a ceramic powder layer which is then sintered. The inhibition layer is subsequently removed.

US Patent Publication No. 2014/0339745A1 to Stuart Uram, discloses a method of making an object using mold casting comprising applying a slip mixture into a mold fabricated using Additive Manufacturing and then firing the mold with the mixture inside. The disclosure discusses a composition of 10-60% by weight of calcium aluminate and a filler.

Powder Injection Molding (PIM) is a process by which finely-powdered metal (in MIM—Metal Injection Molding) or ceramic (in CIM—Ceramic Injection Molding) is mixed with a measured amount of binder material to comprise a feedstock capable of being handled by injection molding. The molding process allows dilated complex parts, which are oversized due to the presence of binder agent in the feedstock, to be shaped in a single step and in high volume.

After molding, the powder-binder mixture is subjected to debinding steps that remove the binder, and sintering, to densify the powders. End products are small components used in various industries and applications. The nature of the PIM feedstock flow is defined using rheology. Current equipment capability requires processing to stay limited to products that can be molded using typical volumes of 100 grams or less per shot into the mold. The variety of materials capable of implementation within PIM feedstock are broad.

Subsequent conditioning operations are performed on the molded shape, where the binder material is removed and the metal or ceramic particles are diffusion bonded and densified into the desired state with typically 15% shrinkage in each dimension. Since PIM parts are made in precision injection molds, similar to those used with plastic, the tooling can be quite expensive. As a result, PIM is usually used only for higher-volume parts.

International Patent Application No. PCT IL (73292) to the present applicants discloses a way of carrying out Additive Manufacturing using ceramics and metals that is relatively fast, capable of creating complex geometries and compatible with a large variety of materials. The disclosure teaches combining Additive Manufacturing with molding techniques in order to build shapes that have hitherto not been possible with conventional molding or machining technologies or in order to use materials that are difficult or impossible to use with known Additive Manufacturing technologies, or to build shapes faster than is possible with known Additive Manufacturing technologies. In examples, Additive Manufacturing is used to make a mold and then the mold is filled with the material of the final product. In some variants, layers of the final product are separately constructed with individual molds, where a subsequent layer is made over a previously molded layer. The previously molded layer may in fact support the mold of the new layer, as well as provide the floor for the new layer.

In one variant, a printing unit is provided which has a first nozzle for 3D printing material to form the mold, and a second, separate, nozzle to provide the filler. The second nozzle may be adjusted to provide different size openings to fill different sized molds efficiently. In other variants two separate applicators are provided, one for printing the mold and having three degrees of freedom as needed for 3D printing, and one for filling the mold after it has been formed One variant comprises the use of inkjet print heads to print the mold using wax or any other hot melt or thermo-set material, and the possibility to level the paste cast deposited layer by use of a self-leveling cast material. An alternative for leveling the cast is by vibrating the cast material just after molding, and a further alternative comprises using mechanical tools such as squeegee or blade and to fill and level the mold.

In this variant, the metal or ceramic paste is in liquid form, and is applied within the mold by means of a doctor blade or a squeegee and forms a thin layer. A planing process machines the hardened paste using a cutter or planer to form a smooth surface.

Prior to planing, the paste may undergo a drying process. In the drying process, part of the liquids in the paste may be removed, and it is desirable that drying is relatively quick so as not to slow down manufacture of the part. Additive manufacture is in any case a relatively slow process and anything that can speed it up is desirable.

It is common to dry pastes by raising the temperate using for example hot air. However, in the present case the outer mold is made of low melting temperature materials such as wax to facilitate easy removal at the end of the manufacturing process. The mold for the ready formed layer is often needed in situ for the following layer so it is not generally possible to remove the mold while manufacture is still in progress. Accordingly drying cannot make use of temperatures that exceed some 50 °C Irrespective of the possibility of melting the mold, it is generally not recommended to raise the temperature since the different thermal expansion rates of the mold and the building material of the part may lead to damage of the part or at least weaken its mechanical properties.

Thus, to summarize, prior to applying a new level or plaining, the existing level must be dried. Generally drying is carried out using heating but the presence of wax or other low melting point materials limits the temperature that may be used, and the lower the temperature the longer drying may take. Layerwise manufacture must in any event pause at each layer for drying before the next layer can be manufactured and the present disclosure addresses the issues of drying and in particular drying time.

SUMMARY OF THE INVENTION

In the present embodiments, vacuum is used to assist drying and more particularly to carry out hardening of the paste or other filling used in the mold to form the layer. More particularly, at each layer the mold is formed and then filled with a paste or other substance, and then the newly filled layer surface is placed in a vacuum so that the pressure quickly falls to change the boiling points of the liquids in the layer. The liquids thus evaporate to harden the layer. After hardening, the vacuum is released, and the volume is vented.

According to an aspect of some embodiments of the present invention there is provided a method of hardening a layer formed from a paste comprising:

forming a layer from a paste;

sealing the layer in a sealing hood;

applying a vacuum to the sealing hood; and retaining the vacuum for a predetermined duration.

The method may comprise forming said layer from a paste by:

printing a first mold to define one layer of said product;

filling said first mold with a paste material, thereby forming a first layer;

removing the vacuum following said retaining;

removing the seal; and printing successive further layers, each over a respective preceding layer, for each layer repeating said printing a mold, filling with paste, sealing, applying a vacuum, removing the vacuum and removing the seal; thereby to form a molded layered product.

The method may comprise smoothing or planing said first layer after forming and prior to printing said second mold; thereby to form said second layer on a finished surface of said first layer.

The method may comprise heating each layer with warm air prior to sealing.

The method may comprise continuing to apply said warm air for between ten and a hundred and fifty seconds, or about thirty seconds.

In an embodiment, the mold printing material has a mold melting point which is lower than a melting point of said cast material.

In an embodiment, said warm air is at a temperature lower than said mold melting point.

In an embodiment, said vacuum is a sufficiently low pressure to cause liquids at said warm air temperature to boil.

In an embodiment, said vacuum is of sufficiently low pressure to draw remaining liquids from said paste.

In an embodiment, said vacuum comprises an absolute pressure of between 0.01 millibar and 100 milliBar, or between 0.1 millibar and 25 millibar, or about one millibar.

In an embodiment, said vacuum time is between 10 and 150 seconds or about thirty seconds.

The method may comprise carrying out a cycle of said sealing, applying and removing the vacuum and removing the seal a plurality of times for each of at least some of said layers.

The method may comprise carrying out a cycle of said heating, said sealing, applying and removing said vacuum and removing said seal a plurality of times for each of at least some of said layers.

In an embodiment, said cycle is repeated on a respective layer until a predetermined hardness is reached.

In an embodiment, said filling said mold with a paste material comprises using a squeegee to spread said paste material into said mold.

The method may comprise using at least two different paste materials in different layers.

In an embodiment, said sealing comprises closing a vacuum hood around respective layers.

According to a second aspect of the present invention there is provided apparatus for hardening a paste within walls of a mold, the apparatus comprising:

- a sealing hood configured to open to a first position allowing paste to be applied within said mold and closed to provide a seal around said mold and said paste applied within said mold; and
- a vacuum source configured to evacuate air from said sealing hood in said closed position to apply a vacuum to said paste, thereby to harden said paste.

In an embodiment, the apparatus includes a heater to heat said paste prior to sealing to a temperature below a mold melting temperature.

The sealing hood may be configured to carrying out said sealing, applying and removing the vacuum and removing the seal, a plurality of times for each of at least some of said layers.

The warm air blower may carry out said heating a plurality of times for each of at least some of said layers.

A squeegee may spread said paste material into said mold.

A planer may plane or smooth respective layers after hardening.

The heater may be a warm air blower or an infra-red radiation source.

A gasket may be placed around a base of the vacuum hood.

A hardness measuring device may measure a hardness of a layer.

The present embodiments further encompass a product comprising a plurality of layers manufactured using the apparatus or method disclosed herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Operation of the 3D printing device of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
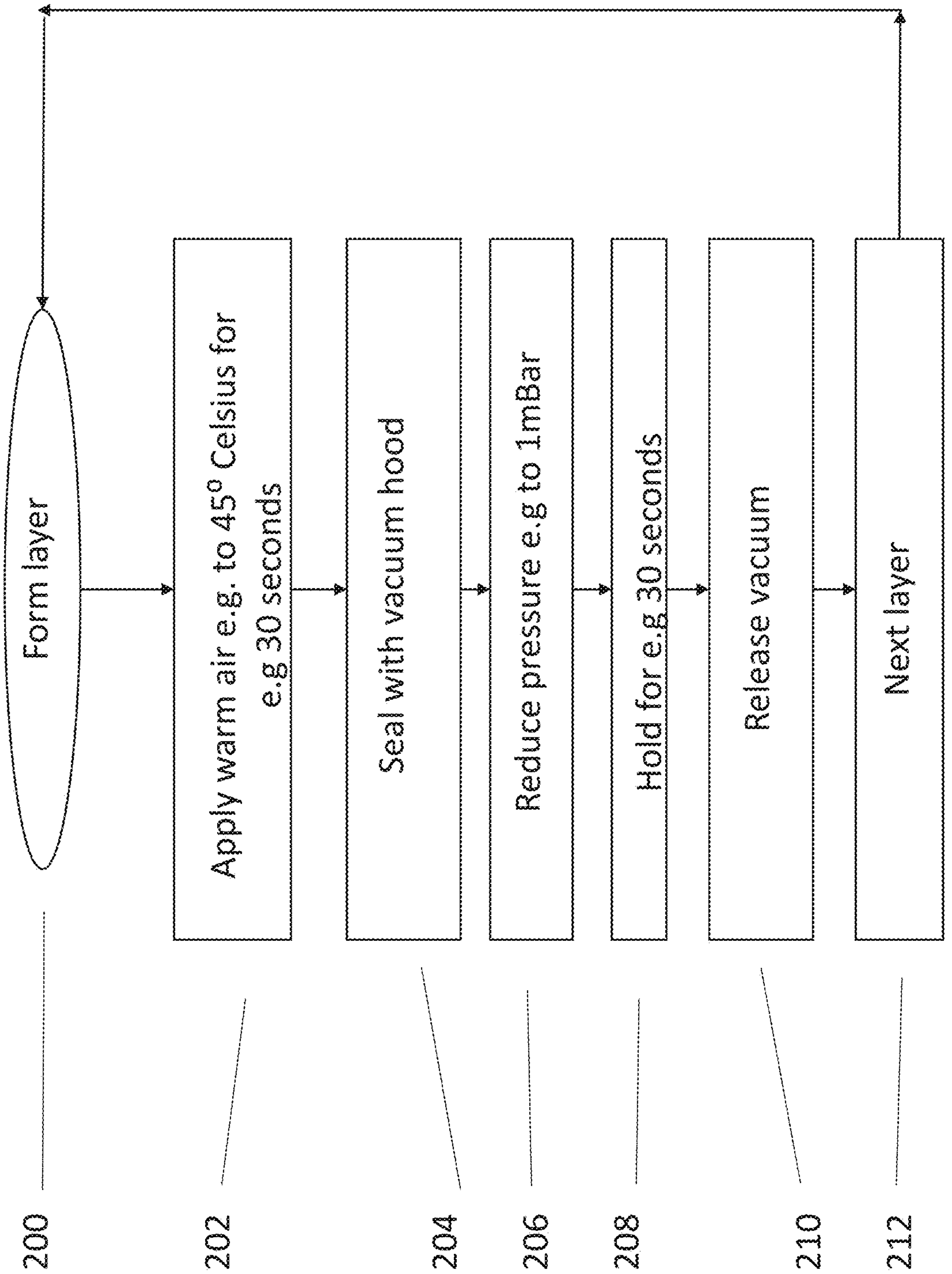
FIG. 1 is a simplified flow chart illustrating a procedure for hardening a layer formed from a paste spread into a mold according to an embodiment of the present invention.

The present embodiments are based on applying a vacuum to facilitate hardening of the part during the manufacturing process.

Boiling temperature of a substance is a function of the pressure. For example, at a pressure of 1 Bar (1 Atm), the boiling temp of water is about 100 C. On a mountain top at a height of 4500 m, water however boils at just 85 C, due to the lower atmospheric pressure.

At the much lower near-vacuum pressure of 20 mbar, the boiling point of water is around 25 °C, at 10 mbar the boiling point is around 7 °C, and a vacuum at the even lower pressure of 1 mbar not only provides an even lower boiling point but may also draw out the liquids that remain in the paste and mold. Hence, the effect of a vacuum on hardening of a paste is not merely actual drying but also the removal of the trapped liquids.

Based on the above, an embodiment of the present invention involves firstly forming a layer, for example by printing a mold and then filling the mold with a paste. The building part layer may then be heated with hot air, say for 30 sec, at 45 °C.

Following heating, the layer is capped with a vacuum hood that forms a vacuum seal around the layer. The seal may generally extend around the rest of the part insofar as it has been manufactured. The volume within the hood is then pumped to provide a suitable level of vacuum, for example at a pressure level of around 1 mbar and the low pressure is then held for a predetermined amount of time, say 30 seconds.

Finally, the volume is vented to atmospheric pressure.

The first, heating, stage may excite the part surface to increase the energy of the liquid molecules, generally water or various solvents.

In embodiments, cycles of heating followed by vacuum may be used. In further embodiments, the venting to release the vacuum may be carried out using warmed air.

A possible apparatus for carrying out the above method for hardening a paste within walls of a mold, may comprise a sealing hood that opens to a first position allowing paste to be applied within the mold and then closes to provide an airtight seal around the mold and the paste applied within the mold. Then a vacuum source evacuates air from the sealing hood in its closed position to apply a vacuum to the paste. The vacuum removes water or other liquids from the paste, and thus hardens the paste.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified flow chart showing a method of manufacturing a molded layered product. A first layer is formed using a paste—box 200. As will be explained below, in embodiments a mold may be printed enclosing an area which is to be filled by paste and the paste is spread within the printed mold to form the layer. Other methods to form a layer from a paste may be used.

As shown in box 202 there is an optional stage of heating the layer. For example warm air may be blown onto the newly formed layer. Heating is optional because hardening using a vacuum works even without prior heating of the paste. However the use of heating may improve evaporation rate efficiency. The mold is typically made of a low melting point material, or alternatively of an easily soluble material, for easy removal subsequent to printing. Thus heating may be limited to temperatures that are below the mold melting temperature, say kept at 20° Celsius below the melting temperature. Thus for example if the mold melting temperature is 80° Celsius then heating may be limited to 60 °C. If warm air is used for heating then the warm air is kept at least slightly below the melting temperature of the mold material.

Subsequently the newly formed layer may be sealed into an airtight chamber, for example by closing a vacuum hood over the emerging structure of the part or product being formed—box 204.

A vacuum may then be applied to the layer for a preset amount of time to harden the paste. The vacuum needs to be enough to cause liquid within the paste to boil at the current temperature.

Figure 4:
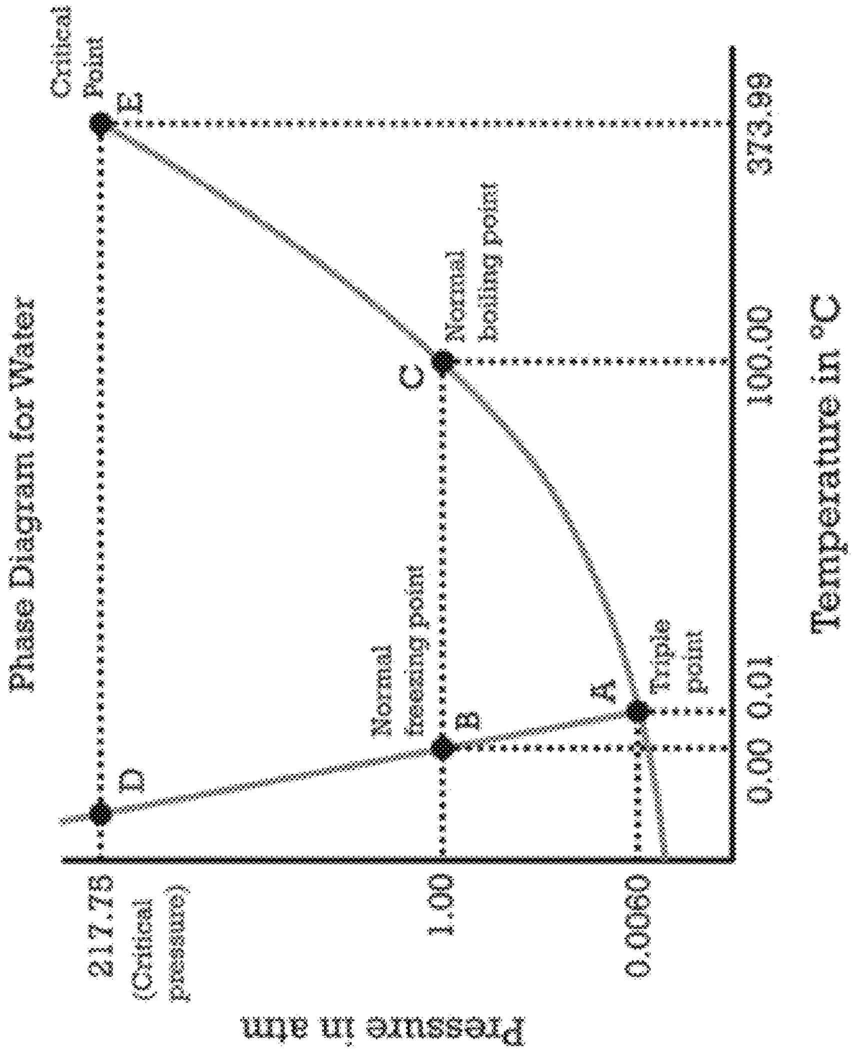
FIG. 4 is a simplified diagram showing a phase characteristic for water.

FIG. 4 shows the phase diagram for water based on a logarithmic scale and for low pressures such as 10 mbar, the boiling temperature of water is 6.8 °C. At the even lower pressure of 1 mbar, the boiling point may cease to be the only mechanism involved, and the low pressure may actually draw residual vapor from the paste. The vacuum may be held for a preset delay chosen to be effective, for example 30 seconds—as per box 208. It is pointed out that the paste may contain solvents other than water that may have their own phase diagrams.

The vacuum may be released and the vacuum hood removed, as per box 210.

The process may be continued 212 with the printing of successive additional layers, each over a preceding layer. For each layer a mold is printed and filled with paste. The layer is sealed. The vacuum is applied, held for the required time and then released, and eventually a molded layered product or part may result.

Figure 3:
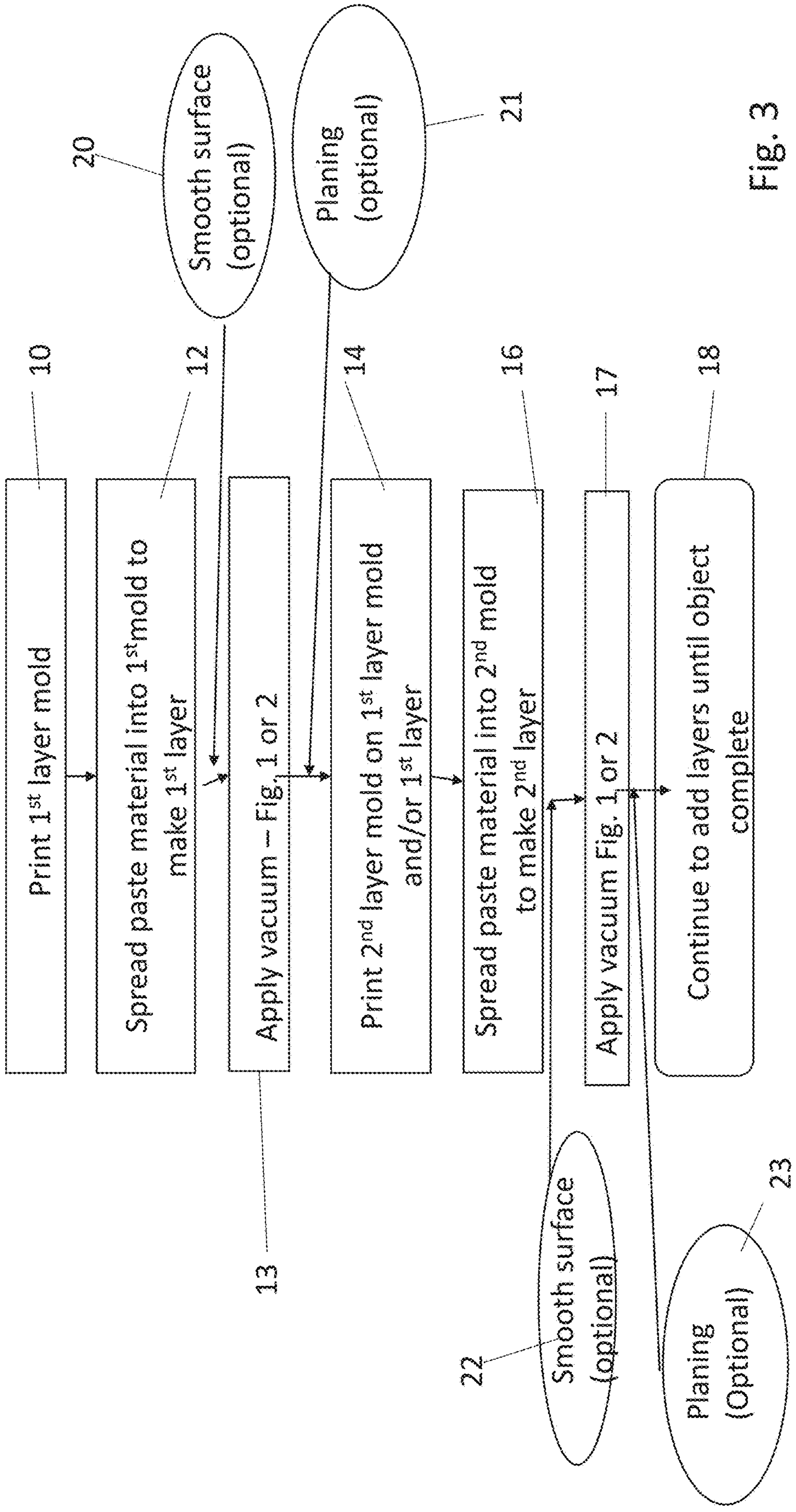
FIG. 3 is a simplified flow chart illustrating a procedure for producing a layered molded product or part according to embodiments of the present invention.

As shown in box 20 in FIG. 3, smoothing may be carried out of the layer currently being formed. Smoothing may be carried out before hardening by running a spatula, blade or the like over the surface. Alternatively or additionally, smoothing may be carried out after hardening, say by cutting away any unwanted protrusions using a planing process. As a further alternative, smoothing may be carried out before and planing after hardening. In either case a smooth surface may be provided as the base for printing the mold for the following layer. This is to ensure that the next layer is produced on a finished surface of the preceding layer.

Figure 2:
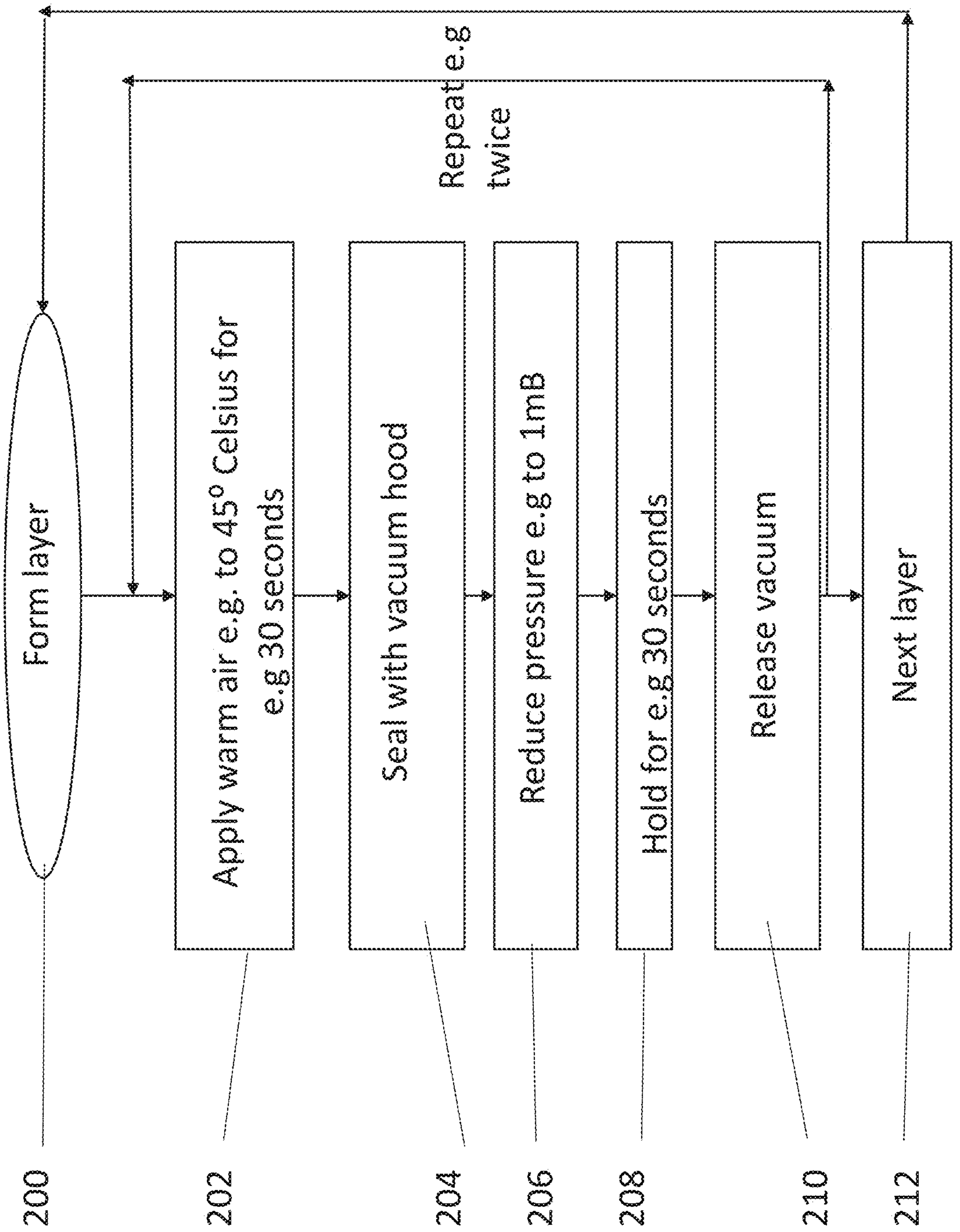
FIG. 2 is a simplified flow chart showing a variation of the procedure of FIG. 1 in which certain hardening phases are repeated for individual layers.

Reference is now made to FIG. 2, which shows a variation of the embodiment shown in FIG. 1. Parts that are the same as in FIG. 1 are given the same reference numerals and are not discussed again except as needed for understanding the present variation. As shown in FIG. 2, sealing 204, applying a vacuum by reducing pressure 206, holding for a preset time 208, and releasing the vacuum, are repeated for individual layers, so that the vacuum may be applied twice, three times or more for individual layers.

Heating 202 may also be applied twice, three times or more. In an embodiment, the vacuum hood remains over the layer throughout the cycle. The layer is initially heated, then the vacuum hood is applied. The vacuum is applied and held for the requisite time and then released by allowing warmed air into the vacuum hood. The vacuum is then reapplied by evacuating the hood of the warmed air.

Planing may be carried out with each layer after hardening.

In an embodiment the hardness of the layer is tested after one cycle. If the hardness is below a predetermined level then a further cycle is carried out.

In more detail, after printing the mold, applying the paste and filling the mold with the squeegee, the paste is wet. In the next process, the air-drying process, part of the liquids in the paste are removed, however, the layer is not hard enough and cannot survive the planing process.

The vacuum stage dries and removes most the liquids trapped in the part during build up.

After applying the vacuum process, the layer may be hard enough to withstand the cutting (planing) process, and there is a correlation between hardness and strength—and a hard layer means a strong green strength for the part. Green strength is discussed in greater detail below.

There are several methods and scales to measure hardness, and common methods used in engineering and metallurgy fields are Indentation hardness measures. Common indentation hardness scales are Rockwell, Vickers, Shore, and Brinell, amongst others, and in an embodiment, a Shore A hardness test is carried out using a durometer. Layers that achieved a level at or above 90 Shore A could be effectively planed. Layers whose hardness was below 90 Shore A could be damaged in the planing process. Thus in an embodiment, if a cycle of vacuum and heat does not harden the layer to 90 Shore A, then the cycle is repeated. If the required hardness is reached then no further cycles are used.

In a further embodiment, the vacuum hood may be placed initially over the layer as soon as it is formed, and the initial heating may also be carried out by inserting warmed air into the hood. The subsequent vacuum may in some embodiments involve warmed air at suitably low pressure. Other methods of heating include using infra-red radiation. Radiation heating may be applied during the vacuum.

It is noted that successive layers of the product or part may be made of the same materials, facilitating fusion of the layers. Alternatively, different paste materials may be used in different layers, say when the product or part requires different mechanical properties in different places. Reference is now made to FIG. 3, which is a simplified flow chart showing a method of manufacturing a molded layered product according to the present embodiments. A first box 10 indicates printing a first mold to define one layer of the product. The mold may be printed using known Additive Manufacturing technology. Box 12 indicates spreading a paste material to fill the mold printed in box 10. A squeegee may spread the paste material across the mold.

The paste material may then form a first layer of the eventual molded layered product but is currently soft, containing considerably liquid, and the procedure outlined in FIG. 1 or 2 may be applied to harden the layer—box 13.

In box 14 a second layer mold is then printed on the first layer and/or on the first molding layer. In some cases the second layer is smaller than the first layer in at least one dimension, so that the second layer mold is deposited on the paste part of the first layer. As will be discussed in greater detail below, the paste layer has now been hardened to support the printing of the second layer mold.

In box 16 more paste material is poured into the second layer mold to form the second layer of the product. As shown in box 17 the hardening procedure of FIG. 1 or 2 is carried out. As shown in box 18, further layers are added to form a molded layered product or part with the requisite number of layers.

After pouring and optionally before or after hardening or both, the new surfaces of the cast layers may optionally be smoothed, finished, planed or polished with finishing tools as shown in 20, 21, 22 and 23.

The molds may be printed using any standard mold printing material that is strong enough to hold the paste material. In embodiments the layer may be cast, and in such cases the mold may be required to hold the casting material at casting temperatures and other casting conditions.

Any standard 3D printing technique, such as fused deposition modeling (FDM) or Inkjet printing, may be used to print the mold.

In embodiments, the mold printing material has a melting point temperature which is lower than a melting point of the paste or the cast or other filling material, so that heating can be used to clean away the mold once the product is ready. Alternatively, the mold can be removed by dissolving in a suitable solvent.

The cast material may be any material that can fill a mold and which can subsequently be hardened, say by drying or cooling, or by any energy activation transition reaction or sintered to endow the product with the properties needed. In embodiments the cast material may be a mixture of wax or monomer or oligomer activated to impart hardening or polymer emulsion or dissolved polymers that dry to harden the cast material, and either a ceramic powder or a metal powder or a mix of materials. In embodiments wax is not used and the binder is water-based. The end product may then be heated to melt the mold material, or may be immersed in solvent to dissolve the mold, and then may be immersed in solvent to leaching out part of the additives and may be heated to a higher temperature to remove the binders and also may be further sintered to fuse the powder and may even be subjected to other common thermal processes such as HIP (Hot Isotropic Pressure) Thus the present embodiments may provide a way to make molded ceramic or metal or compound products.

A slip, slurry or paste mixture is a suspension of ceramic or and metal particles, optionally a mix of a few powders, in a liquid carrier, such as water or an organic solvent such as polyolefine, Alcohol, glycol, polyethyleneglycol, glycol ether, glycol ether acetate and other) and the cast material may comprise a mixture, such as a water- or solvent based composition of 60-95% by weight of powder or powder mixture.

In embodiments, the mold printing material may have a viscosity which is higher than the viscosity of the paste or other filling material, so that the mold remains intact when the paste material is spread. The paste material may have good wetting properties to fill the mold.

Spreading the paste, or casting or pouring, may be carried out at an elevated temperature, with tight control of materials to provide the mechanical properties necessary. Pouring may use a liquid dispensing system that consists of a dispensing control unit. The quantity of filling material may be set according to supplied sub mold parameters such as volume, overflow factor, etc. Then the paste material may be leveled by mechanical means such as a squeegee, as mentioned above, or a blade or under its own self leveling property with an optional vibrating procedure.

Later on, the Sub Molds, that is the molds of the individual layers, may be removed by exposing the assembly to a higher temperature, or using a chemical dissolving process say with an acid or by immersion in solvent to dissolve the mold material or other processes. Suitable temperatures in the case of a wax based mold may be in the range of 100-200 °C.

A debinding and sintering stage may involve increasing the temperature to allow debinding and sintering of the active part of the cast material, and typical temperatures for de binding and sintering are in the range of 200 °C-1800 °C depending on the exact material and required mechanical properties of the final product.

According to a proposed process according to the present embodiments, a paste cast material is cast under high shear force and under controlled temperature. The paste cast material in this embodiment may be deposited over the previous layer of slip cast material that was cast at high viscosity, hardness and may be at a lower temperature.

When two successive layers are composed of the same material, they may be expected to share properties. In general, paste materials are water or organic solvent based and allow for dispersion of materials.

Drying and sintering may be carried out in ovens, which may be integrated in a single device or may be provided separately.

The process of FIG. 3 is now considered in greater detail.

Filling material such as a slurry or paste may be dried and hardened at a temperature higher than the freeze temperature and lower than the mold material melting point. To ensure the stability of the first layer of cast material such as a slurry or paste, the slurry or paste may be designed to possess rheological properties that cause the still non-flowing material to be hardened and when needed, to include appropriate shear thinning and thixotropy, so that the viscosity may or may not vary.

The binding materials may include a liquid carrier, that is the flowing part of the slurry or paste and used as a functional hardening agent, and may contain organic additives at a final stage, to be removed when no longer required.

The functional powder is the metal or/and metal oxide or ceramic that makes up the body of the final product. The material may be chosen to be thermally treated at >500 °C to fuse the powder after disappearance of the sacrificial materials to form the final solid body, although this may not always be necessary in view of the hardening process described above in respect of FIG. 1. Referring again to FIG. 3, and the process comprises as in box 10, building of the mold, in which 3D printing may use any of: mineral wax at m.p.>120 °C. UV/EB cured acrylic, methacrylic, thermally cured epoxy, polyurethane etc., to form the mold parts.

The mold is then filled 12 with the paste or other filling material. The paste material may be poured, or may in embodiments be injected, under a high shear force into the mold to ensure intimate contact with the mold walls, thereby to ensure proper and complete filling of the mold. The mold itself may be mechanically strong enough to cope with the injection forces.

The now formed (n−1) sub part or layer provides a base for the next, the $n^{th}$, sub-part.

Hardening the paste as shown in FIGS. 1 and 2, may render the layer capable of bearing the load of the subsequent layer of mold material.

The process then continues by printing the next mold layer 14.

The second mold layer may be printed on the surface of the previous layer and may even be built over mold material from the previous layer.

The next stage is to fill the second mold layer, in a similar manner to that carried out for the first layer—16. Hardening 17 may also be provided separately for the second layer.

For each additional layer needed in the product, the stages of printing, filling, optionally heating, and hardening are repeated—18.

The hardened paste in the shape of the final product or product part, is now embedded within the Sub Molds, that is the mold produced for each layer.

The final product or part of a product may optionally be stabilized once all the layers have been manufactured. While stopping the shear forces, the slurry or paste may start hardening, thus developing green strength to the cast material and/or activating hardening agents to impart green strength. Green strength is the mechanical strength which may be imparted to a compacted powder in order for the powder to withstand mechanical operations to which it is subjected after pressing and before sintering, without damaging its fine details and sharp edges.

The mold material may then be removed. Removal may involve heating the product and mold up to the melting point of the mold so that the mold material liquidizes and can be collected for re-use. Alternatively the mold may be removed by chemical dissolution.

In general the hardening process of FIGS. 1 and 2 has removed any sacrificial materials from the paste itself. However certain materials such as organic additives may now be removed by controllably heating to an optimal temperature. The mold has already been removed so that heating is no longer limited by the mold melting point.

After the sacrificial materials are removed, the powder of the active material may be fused into solid form. A thermal treatment such as sintering, may be applied to obtain the desired final properties for the product. Exemplary temperatures between 400 °C and 1800 °C may be used, and in particular temperatures exceeding 500 °C.

Figure 5:
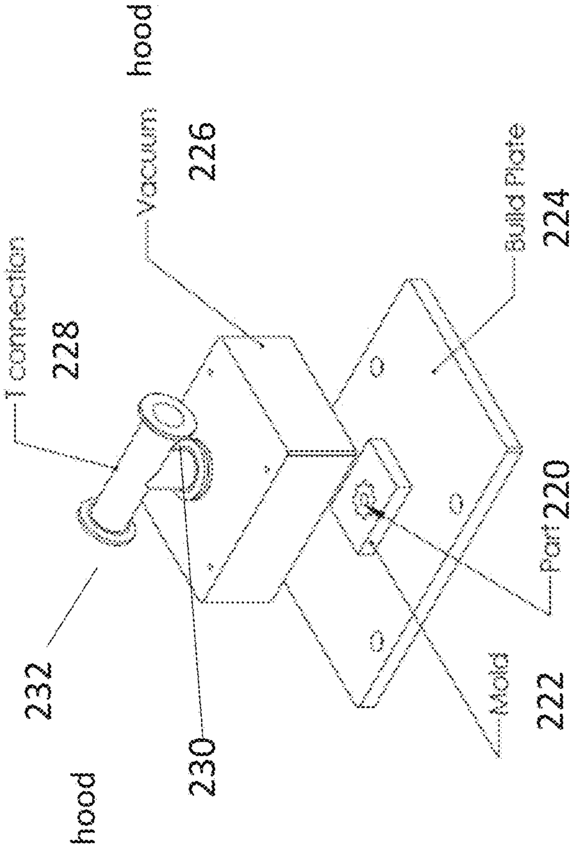
FIG. 5 illustrates a mold, a part being manufactured layerwise using the mold and a vacuum hood for drying each layer according to embodiments of the present invention.

Reference is now made to FIG. 5, which is a simplified schematic diagram showing a part being formed in a mold while a vacuum hood is in a withdrawn position.

Part 220 is formed by spreading a paste into a space within mold 222. The mold is placed on build plate 224. Vacuum hood 226 is shaped to fit onto the build plate 224 around mold 222 so that the paste may be sealed from the surrounding air. A T-connection 228 is located on top of the vacuum hood and has two openings, one 230 for air, optionally warmed air, and the other 232 to connect to a vacuum source to evacuate the hood.

Figure 7:
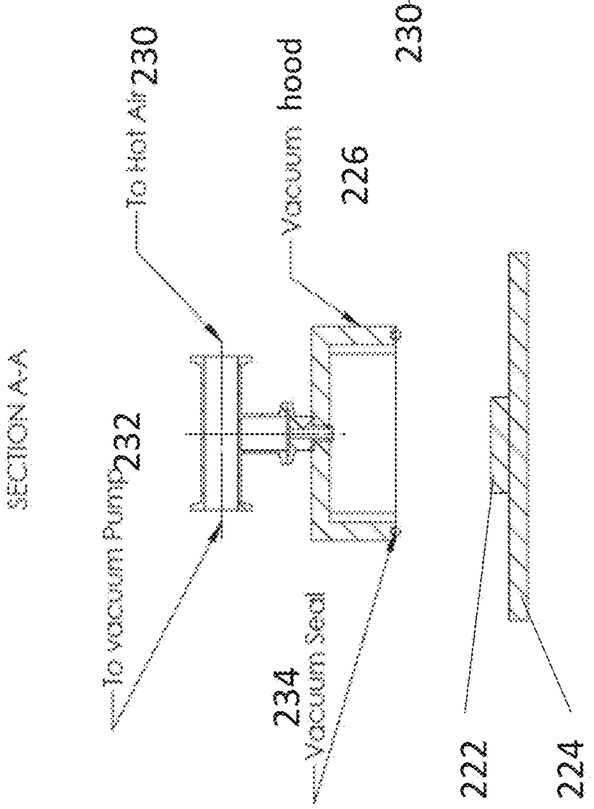
FIG. 7 is a section along the line A-A of the view of FIG. 6.
Figure 6:
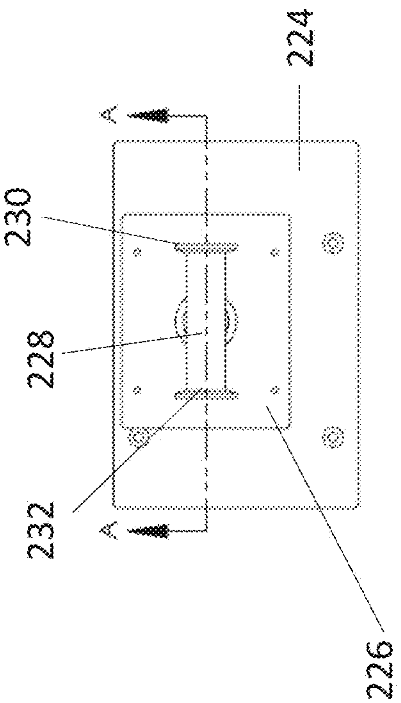
FIG. 6 is a view from above of the vacuum hood of FIG. 5.

FIG. 6 is a view from above of the vacuum hood 226 and FIG. 7 is a cross-section along the line A-A in FIG. 6. A vacuum seal may be provided by running a rubber band or gasket 234 around the base of the hood.

In order to carry out hardening, the vacuum hood 226 is lowered onto the build plate 224 around the mold, and gasket 234 provides a vacuum seal. The mold may be heated by supplying hot air through inlet 230 and a vacuum may be formed by connecting inlet 232 to a vacuum pump.

Figure 8:
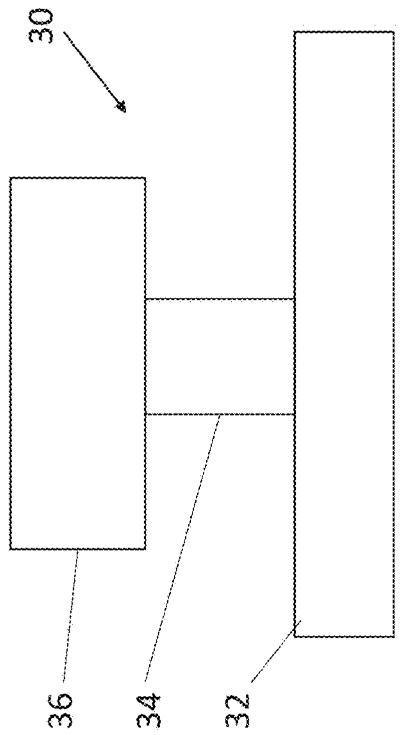
FIG. 8 is a simplified diagram showing a plan for a part to be made using the present embodiments.

Reference is now made to FIG. 8, which is as simplified diagram illustrating a blueprint 30 for a typical product that it is desired to manufacture using the present embodiments. The product has lower ring 32, middle ring 34 and upper ring 36, of which the lower ring has a large radius, the middle ring has a small radius and the upper ring has an intermediate radius.

Figure 9:
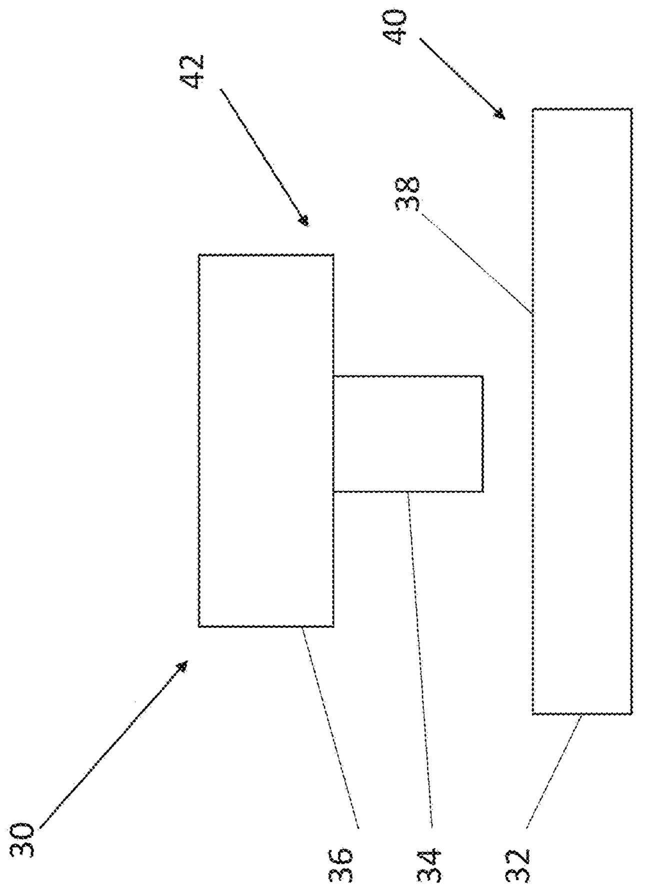
FIG. 9 is a simplified diagram showing one exemplary way of slicing the part of FIG. 8 for layered manufacture according to the present embodiments.

Reference is now made to FIG. 9, which illustrates one way to make the product 30. The product may be decomposed into layers, for each layer to be manufactured separately using the procedure outlined in FIGS. 1-3. One possibility is to choose a fixed layer thickness and make the necessary number of layers of the fixed thickness, but in order to do so, the upper boundary 38 of lower ring 32 should fall exactly at a layer boundary, thus, layer thickness becomes the Z axis resolution providing a constraint as to the part dimension in the Z axis.

Another possibility is to manufacture each ring, 32, 34 and 36 as a separate layer, but then a support structure may be needed for the mold for the third layer, which would otherwise be suspended in mid-air.

In the current example, ring 32 is manufactured as a single first layer 40 and the two rings 34 and 36 are manufactured together as a single second layer 42.

Figure 10:
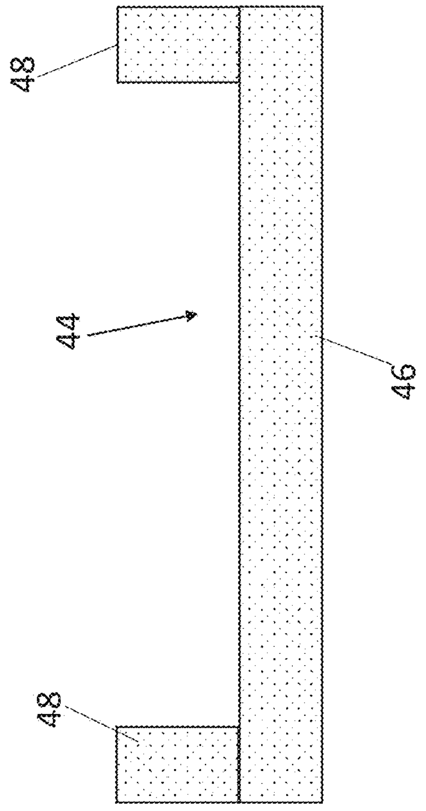
FIG. 10 is a simplified diagram showing a printed mold for a first layer to make the part of FIG. 8.

Referring now to FIG. 10 and a mold 44 is 3D printed for the lower ring part 32. The mold consists of a floor 46 and an enclosing rim 48.

Figure 11:
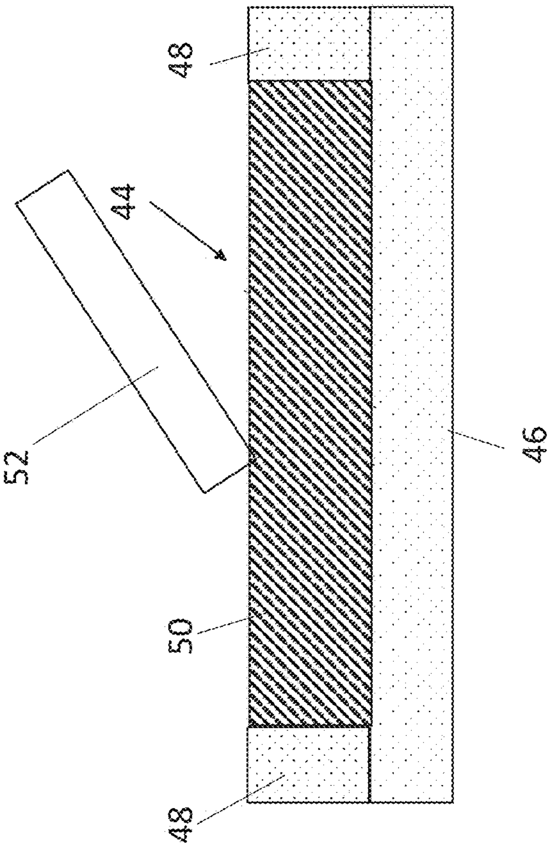
FIG. 11 is a simplified diagram showing casting of the mold made in FIG. 9 in order to form a first layer of the part of FIG. 8.

FIG. 11 illustrates the mold 44 of FIG. 4 filled with a paste material 50. The paste material, which may be a combination with binders and additives, perhaps a metal or ceramic powder, fills the mold over the floor 46 within the rim 48. The paste material may be spread using a spatula or blade or the like 52, as will be discussed in greater detail below.

Figure 12:
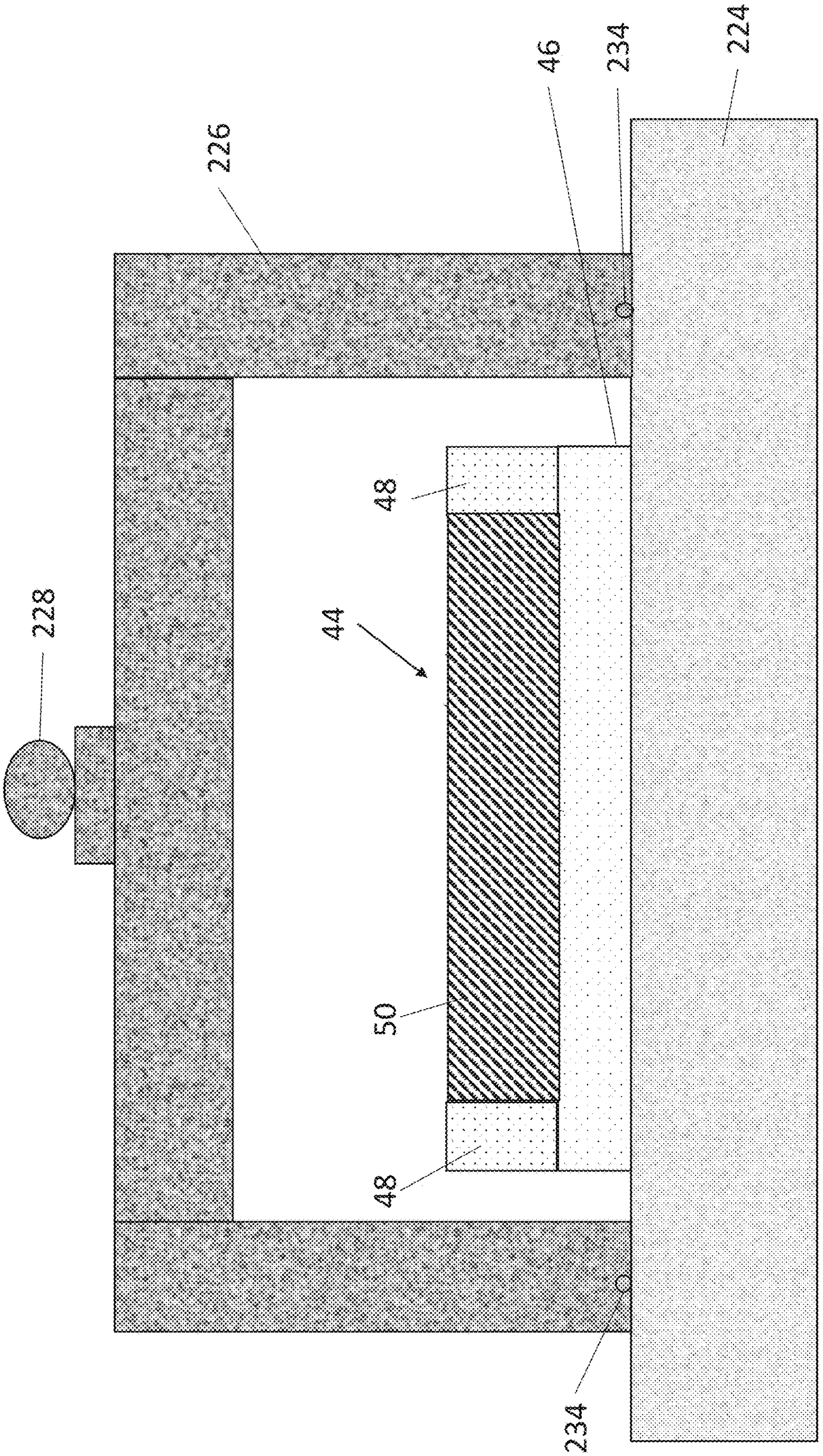
FIG. 12 shows the layer formed in FIG. 11 enclosed in the vacuum hood for rapid drying according to the present embodiments.

Reference is now made to FIG. 12, which is a simplified diagram showing the vacuum hood 226 of FIG. 5 lowered onto build plate 224. Mold 44 filled with paste material 50 surrounded by mold walls 48 is now inside the vacuum hood 226 and may be alternately applied with vacuum and warm air.

Figure 13:
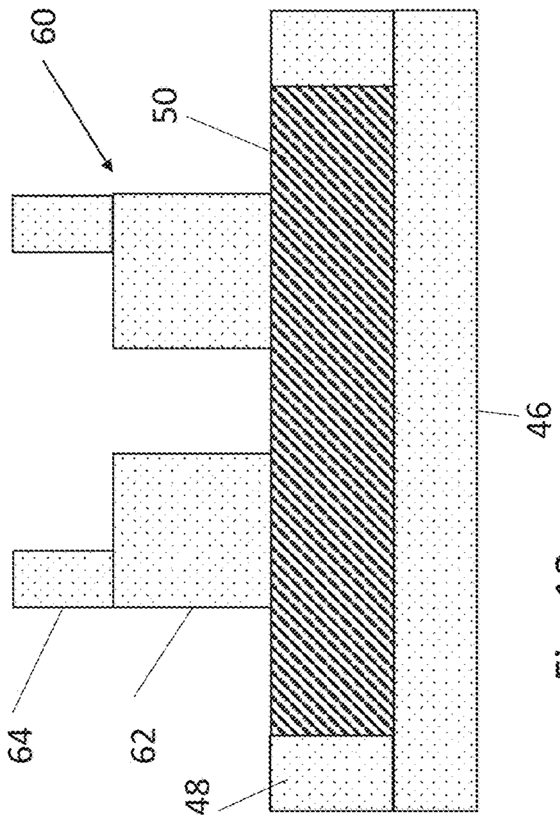
FIG. 13 is a simplified diagram illustrating printing of the mold for a second layer of the part of FIG. 8.

Reference is now made to FIG. 13, which illustrates the printing of the second layer according to the example of FIG. 2. A single mold part 60 is printed having a single outer radius which exceeds the radius of the upper ring 36. Internally a lower part 62 of mold 60 has a radius equal to that of intermediate ring 34, and upper part 64 of mold 60 has a radius equal to that of upper ring 36. The mold part 60 sits on the surface created by pouring of the cast layer 50, so that the existing surface of the product provides support. As the first layer has been hardened using the vacuum hood, no additional support structure is needed.

Figure 14:
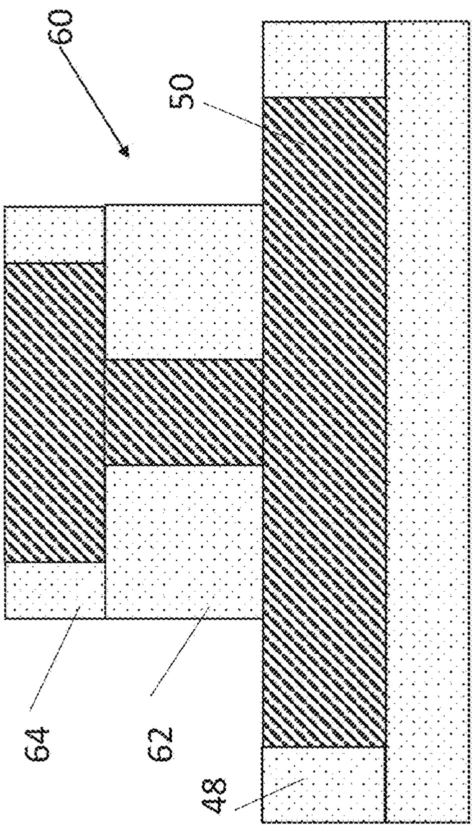
FIG. 14 is a simplified diagram illustrating filling of the mold made in FIG. 13.

Referring now to FIG. 14, and the upper mold part 60 may be filled using more of the same paste material as was used for the lower part, thus to form the upper and intermediate rings of the product. Alternatively different cast materials may be used for different layers. After the paste is spread for each layer the vacuum hood is again lowered as in FIG. 12 and the entire product as so far formed is placed in the resulting vacuum chamber.

Figure 15:
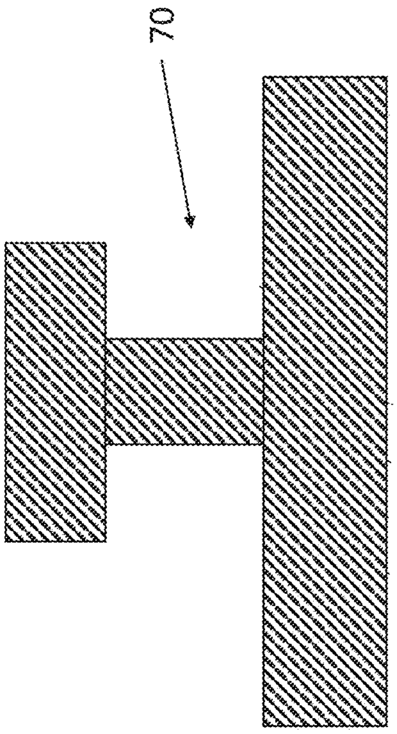
FIG. 15 is a simplified diagram showing the part made according to FIG. 8 after removing of the mold on which vacuum drying may be carried out at each layer according to the present embodiments.

The cast material may be heated or debound or sintered, to remove the binders and to fuse the powder in the cast material. Finally the product 70 emerges from the cast as shown in FIG. 15.

Figure 16:
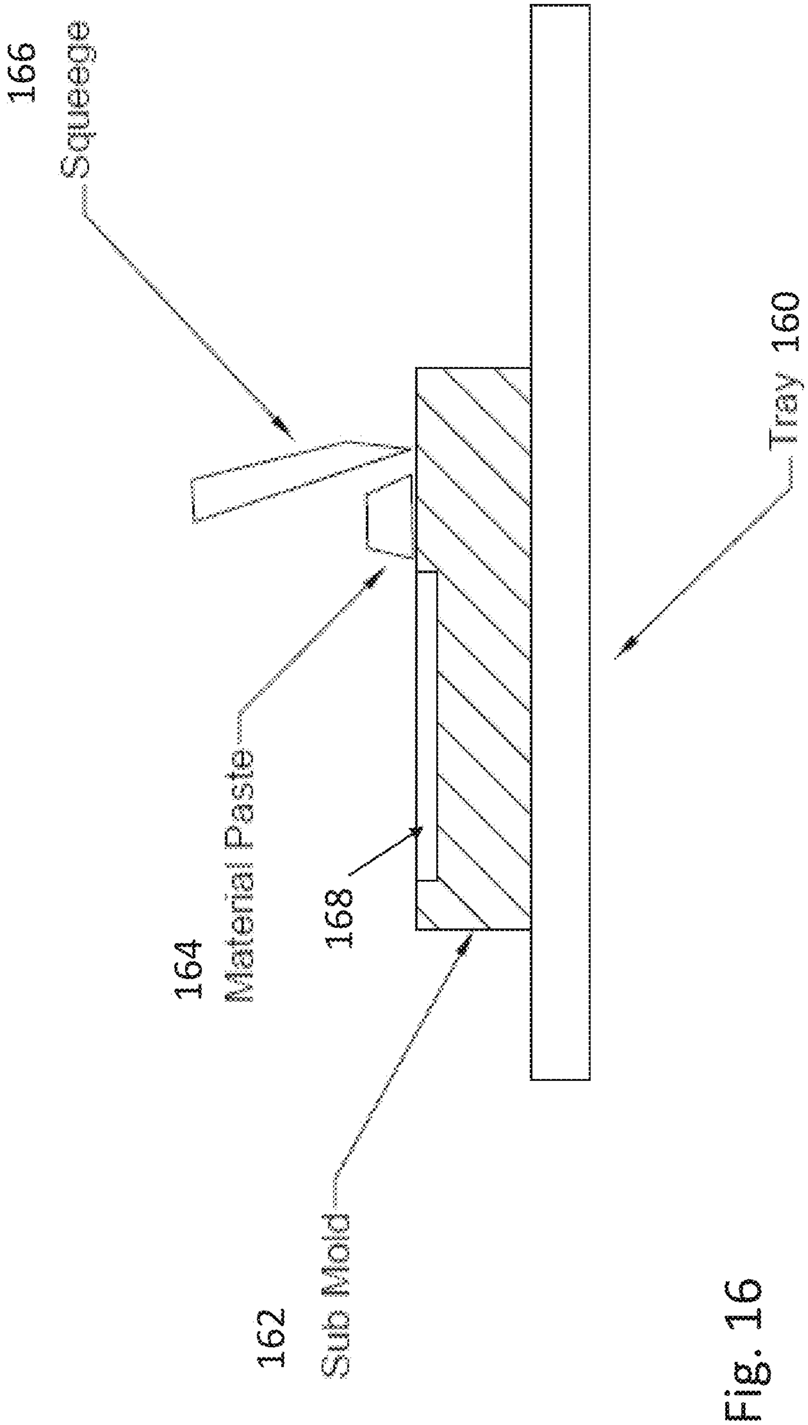
FIG. 16 is a device for making the part of FIG. 8 in which a squeegee spreads a paste to fill the mold.

Reference is now made to FIG. 16, which is a simplified schematic view of a device for forming an individual layer prior to hardening according to the present embodiments. Mold plate 224 carries mold part or sub-mold 162 and a lump of paste 164 is provided to fill the mold. Squeegee 166 wipes the paste across the top of the mold, pushing it into space 168 in the mold and thus filling the mold and finishing the surface at the same time.

The squeegee may be incorporated together with a pouring nozzle (not shown), so that the nozzle may deposit a lump of paste 164 and then the squeegee 166 may push the paste to fill out the space.

It is expected that during the life of a patent maturing from this application many relevant molding, 3D printing and casting technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the present description is to be read as if such combinations are explicitly set forth herein. Conversely, various features of the invention, which are, for brevity, described in the context of a single embodiment, may also be provided separately or in any suitable subcombination or as suitable in any other described embodiment of the invention and the present description is to be read as if such combinations are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of hardening a layer of a product, the layer formed from a paste, the product being formed on a print tray, the method comprising:

providing the print tray for the product;

on said print tray, forming a layer from a paste, said forming comprising:

printing a first mold to define one layer of said product; and filling said first mold with a paste material and spreading said paste material using a blade, thereby forming a first layer;

lowering a sealing enclosure onto said print tray over said product while said product is in a layer forming position to enclose said paste material and said first mold;

sealing the sealing enclosure around said product including said paste material and said first mold;

applying a vacuum to said paste material within the sealing enclosure, wherein said vacuum comprises a sufficiently low pressure to cause liquids at room temperature to boil;

retaining the vacuum within the sealing enclosure under seal for a predetermined duration;

removing the vacuum following said retaining;

raising the sealing enclosure; and forming successive further layers, each over a respective preceding layer, for each layer repeating said printing a mold, filling with paste, sealing around said paste material and mold, applying a vacuum, removing the vacuum and removing the seal; thereby to form a molded layered product, said repeating comprising, for at least some of said layers, carrying out a cycle of said sealing, applying and removing the vacuum and removing the seal a plurality of times, and wherein said cycle is repeated on a respective layer until a predetermined hardness is reached; and applying warm air to each layer prior to said sealing.

2. The method of claim 1, further comprising smoothing or planing said first layer after forming and prior to printing said second mold;

thereby to form said second layer on a finished surface of said first layer.

3. The method of claim 1, comprising continuing to apply said warm air for between ten and a hundred and fifty seconds, or about thirty seconds.

4. The method of claim 1, wherein the mold printing material has a mold melting point which is lower than a melting point of said paste material.

5. The method of claim 4, wherein said warm air is at a temperature lower than said mold melting point.

6. The method of claim 5, wherein said vacuum is of sufficiently low pressure to draw remaining liquids from said paste.

7. The method of claim 1, wherein said vacuum comprises an absolute pressure of between 0.01 millibar and 100 milliBar, or between 0.1 millibar and 25 millibar, or about one millibar.

8. The method of claim 1, wherein said vacuum time is between 10 and 150 seconds or about thirty seconds.

9. The method of claim 1, wherein said filling said mold with a paste material comprises using a squeegee to spread said paste material into said mold.

10. The method of claim 1, comprising using at least two different paste materials in different layers.

* * * * *